(No Model.) 4 Sheets—Sheet 1.
A. T. BREWER.
PRESS.
No. 417,807. Patented Dec. 24, 1889.
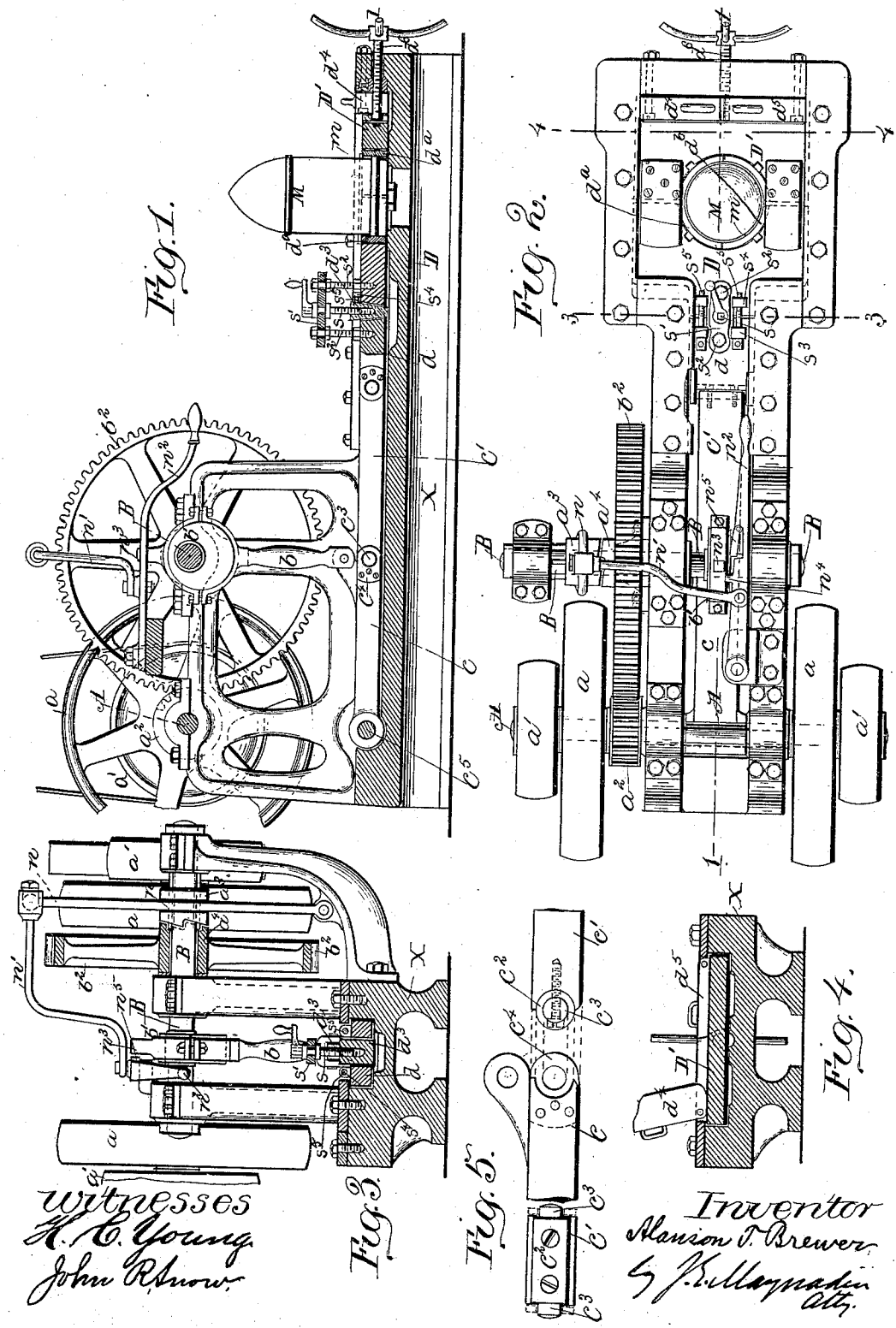

(No Model.) 4 Sheets—Sheet 2.

A. T. BREWER.
PRESS.

No. 417,807. Patented Dec. 24, 1889.

Witnesses
H. C. Young.
John R. Snow.

Inventor.
Alanson T. Brewer,
by J. S. Maynadier
Atty.

(No Model.) 4 Sheets—Sheet 3.

A. T. BREWER.
PRESS.

No. 417,807. Patented Dec. 24, 1889.

Witnesses
H. E. Young.
John R. Snow.

Inventor
Alanson T. Brewer (No Model.)　　　　　　　　　　　　　　　　　　　　4 Sheets—Sheet 4.
A. T. BREWER.
PRESS.
No. 417,807.　　　　　　　　　Patented Dec. 24, 1889.
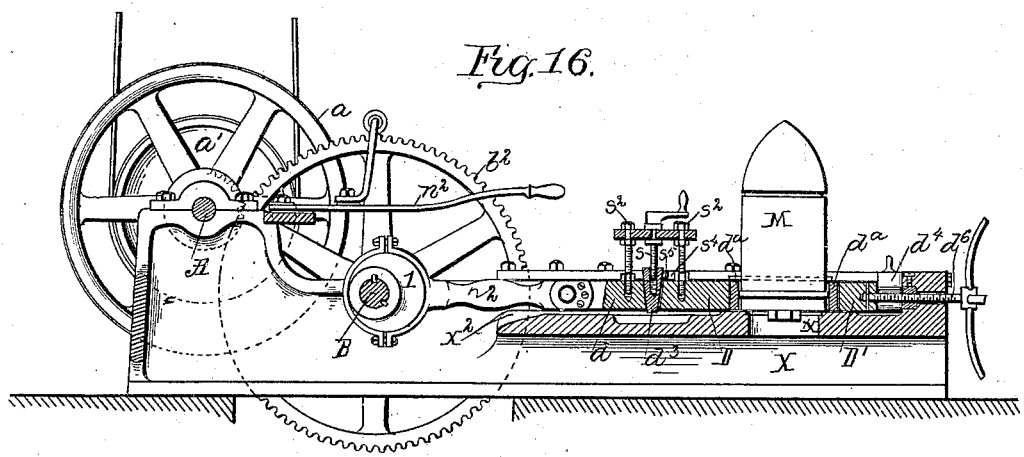
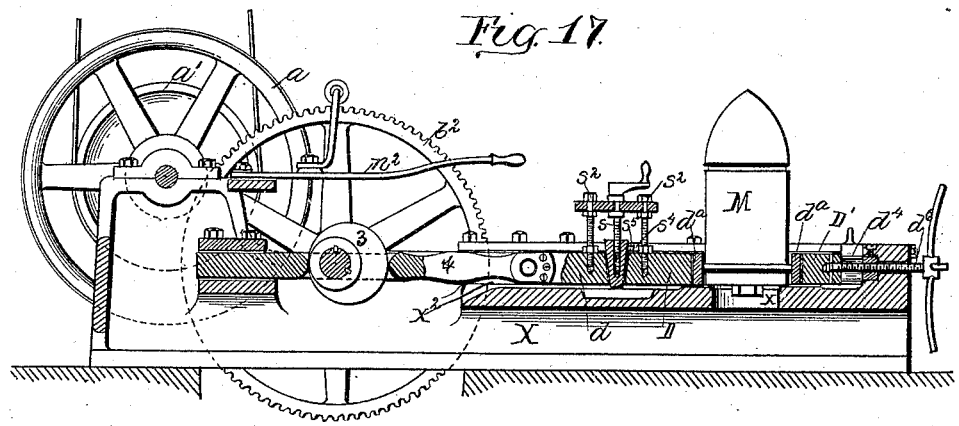
Witnesses
H. C. Young.
John R. Snow.
Inventor
Alanson T. Brewer,
by J. E. Maynadier
Atty.

UNITED STATES PATENT OFFICE.

ALANSON TOWNSON BREWER, OF BOSTON, MASSACHUSETTS.

PRESS.

SPECIFICATION forming part of Letters Patent No. 417,807, dated December 24, 1889.

Application filed April 25, 1889. Serial No. 308,551. (No model.)

*To all whom it may concern:*

Be it known that I, ALANSON TOWNSON BREWER, of Boston, in the county of Suffolk and State of Massachusetts, have invented an Improved Press, of which the following is a specification, reference being had to the accompanying drawings, in which—

Figure 11:
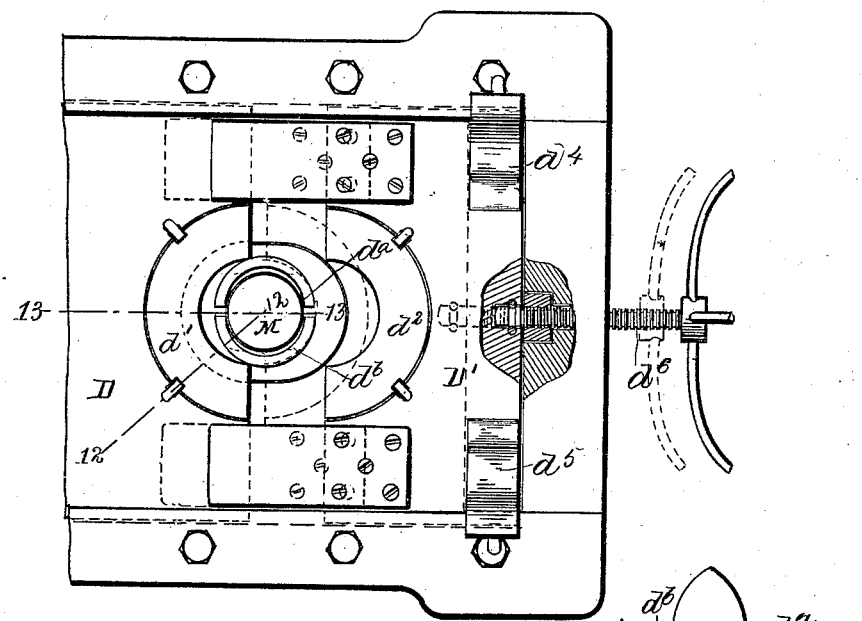
Figure 12:
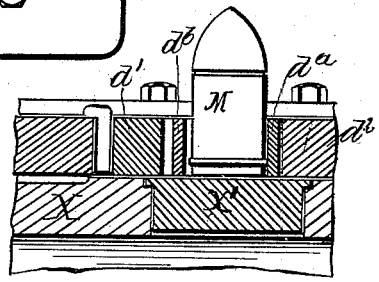
Figures 13, 14:
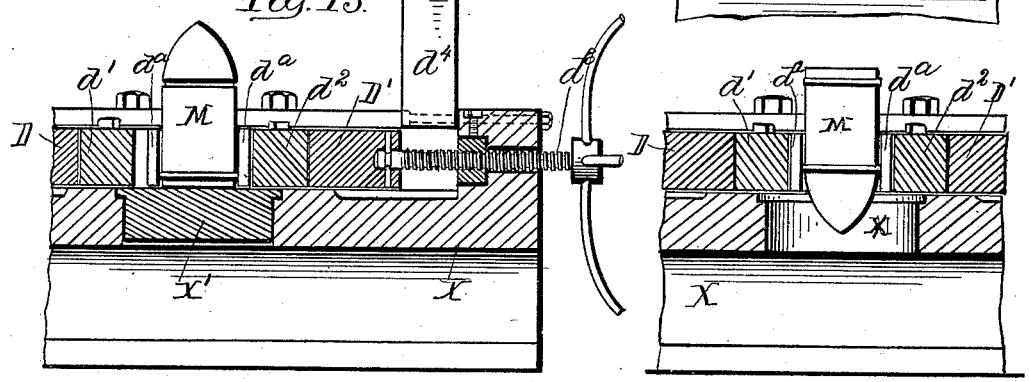
Figure 15:
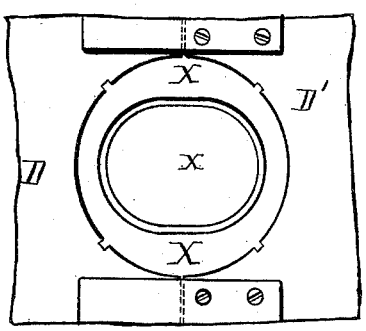

Figure 1 is a sectional elevation on line 1 1 of Fig. 2; Fig. 2, a plan; Fig. 3, a section on line 3 3 of Fig. 2; Fig. 4, a section on line 4 4 of Fig. 2, looking to the right; Fig. 5, a detail, all these figures illustrating the best form of my machine; and Figs. 6, 7, 8, 9, and 10 illustrate one kind of work to which that form of my machine shown in the other figures is mainly applicable. Fig. 11 is a plan of a portion of my machine, showing parts in two positions. Fig. 13 is a section on line 13 13 of Fig. 11; Fig. 12, a section on line 12 12 of Fig. 11, showing the table in place; Fig. 14, a sectional view showing the table removed; Fig. 15, a plan showing the reducers and loose dies. Figs. 16 and 17 are sectional views showing modifications of the connection between one of the shafts and the reciprocating head.

The object of my invention is to provide a simple machine by which a reciprocating head is moved toward a companion head with enormous pressure; and the striking feature of my invention is the combination of a reciprocating head and a companion head with two rotary shafts, one of which is provided with one or more fly-wheels and drives the other shaft, which is connected with the reciprocating head.

In the drawings, A is the driving-shaft; B, the auxiliary shaft; C C', a toggle, (which is the preferred connection between the auxiliary shaft B and the reciprocating head,) and D one of the heads. In this preferred construction shaft B is connected to the middle joint of the toggle by the connecting-rod $b$, the upper end of which is shown as an eccentric-strap surrounding an eccentric $b'$ fast on shaft B.

$a\ a$ are fly-wheels, and $a'\ a'$ pulleys fast to shaft A, and shaft A is so connected to shaft B that both may be caused to revolve together.

Figure 6:
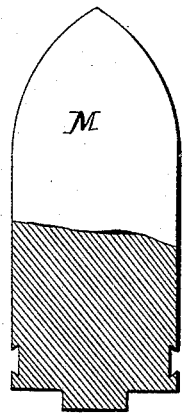
Figure 7:
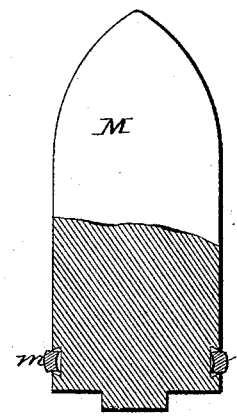
Figure 8:
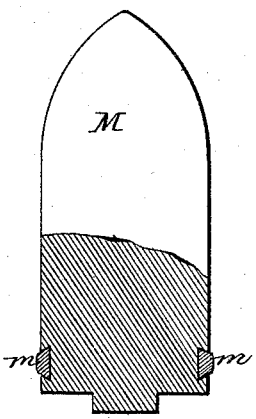
Figure 9:
Figure 10:
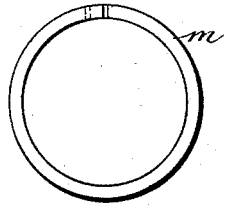

When the machine is designed for heavy work, the gear $a^2$ should be much smaller than the gear $b^2$. It will now be clear that when power is applied to shaft A through pulleys $a'$ gear $a^2$ will cause gear $b^2$ to revolve, and gear $b^2$, having been made fast to shaft B, will carry that shaft with it, and shaft B will carry with it the eccentric $b'$, which, acting through rod $b$, will bring the two arms of the toggle C C' nearly into line, and thereby force head D with great power toward the companion head D', thereby forcing the dies $d'\ d^2$ against the metal between them, which, as shown in Figs. 6, 7, 8, 9, and 10, is a strip of copper or the like to be applied to the shot or shell M, the pressure being sufficient to cause that strip of copper $m$ to fill the groove in the shot, as shown in Fig. 8, even though that strip when bent around the shot and assuming the shape shown in Fig. 10 be a loose fit, as in Fig. 7. The pressure also forces the ends of the strip $m$ into an exceedingly close and firm contact.

In practice I prefer to press the band $m$ twice, the shot being turned one-quarter round on its axis after the first pressure and before the second; but this whole matter of banding shot forms the subject-matter of and is fully described in my application for patent of even date herewith, and is here shown simply to illustrate one of the many uses to which my present invention is applicable.

For most uses it is desirable to so mount the gear $b^2$ on its shaft B that it can be connected and disconnected at pleasure, as thereby the shaft A may revolve continuously and only actuate shaft B and toggle C C (or other connection between shaft B and reciprocating head D) as often as desired; and another feature of my invention consists in this combination of the toggle (or other form of connection between shaft B and head D) and the head D with the shafts A and B by means of the gears $a^2\ b^2$ and the clutch $a^3\ a^4$, that clutch serving to connect the gear $a^2$ with or disconnect it from shaft B at pleasure.

As shown in the drawings, the yoke $n$ straddles the sliding member $a^3$ of the clutch, and that yoke is controlled by connecting-rod $n'$ and lever $n^2$.

In order to stop the machine with the head D drawn back from the head D'—that is, (in the preferred construction) with the toggle-arms C C' at an angle one with the other, (instead of in substantially the same line as in Fig. 1)—I use a projection $n^3$, which moves with the connecting-rod $b$, and engages with a stop $n^4$ on lever $n^2$, the stop $n^4$ being carried into the path of the projection $n^3$ when lever $n^2$ is thrown forward to disconnect the clutch $a^3$ $a^4$. For greater caution it is well to use an additional stop $n^5$ on lever $n^2$, which is hinged so as to yield when the lever $n^2$ is thrown forward, so as to force the stop $n^5$ against the projection $n^3$, but which springs out into place after projection $n^3$ has passed it, this stop $n^5$ preventing motion of projection $n^3$ in one direction, while stop $n^4$ prevents motion of that projection in the opposite direction, the two together effectually preventing the toggle-arms C C' from falling down into the position shown in Fig. 1.

For heavy work I prefer to use a toggle-connection for the shaft B and reciprocating head D, and the construction of the toggle and its connection with the head D is of great importance; and another feature of my invention consists in a toggle whose two parts C C' are connected by means of a cylinder $C^2$, having trunnions $C^3$, the cylinder fitting in curved recesses in the ends of the arms C C', and being held to one of the arms (in this case C) by cheek-pieces $C^4$, which receive the trunnions $C^3$. This construction is applicable, of course, to both ends of the toggle C C', as well as to the middle, and in practice it is desirable to connect the toggle-arm C' with the intermediate portion $d$ of head D. The pin $C^5$, by which the toggle-arm C is connected to the bed, may be of any desired size, and therefore the cylinder $C^2$ and cheeks $C^4$ are not usually desirable at that end of the toggle.

Another feature of my invention consists in the combination of the head D with the toggle C C' (or other connection for shaft B and head D) of an intermediate portion $d$ and an adjusting-wedge $d^3$. This wedge is adjusted by means of a screw $s$, mounted in the cross-piece $s'$, the cross-piece being sustained by the studs $s^2$, one stud being fast to $d$ and the other to D. While the cross-piece $s'$ might serve to connect $d$ with D, so that when $d$ was drawn back it would carry D with it, yet in most cases it is desirable to have an additional connection for that purpose, as shown at $s^3$ and $s^4$, which are projections, one from $d$ and the other from D, connected by screws $s^5$. It will be clear that the studs $s^2$ project through slots in the cross-piece $s'$, so that when the wedge $d^3$ is adjusted so as to give the precise throw required to the head D the studs $s^2$ move in the slots in the cross-piece $s'$. After the wedge $d^3$ is adjusted the screws $s^5$ are tightened, thus practically making the parts $d$, D, and $d^3$ one rigid head.

To make the machine applicable to a greater variety of work, the dies or reducers $d'$ $d^2$ are made removable from the heads D D', being keyed or otherwise temporarily secured therein, and the combination of the heads D D' with removable dies or reducers $d$ $d'$ is another feature of my invention.

In subjecting the article to the enormous pressure obtained in this machine, a flash or fin is produced, and in order to remove this fin and also to compress the article with greater certainty I subject it to a second pressure, turning the article in the dies and using auxiliary dies $d^a$ and $d^b$, which are loose in the opening between dies $d'$ $d^2$ and adjustable by the attendant as the jaw D moves up. In using these dies $d^a$ $d^b$, which for greater convenience are provided with handles, as shown, the attendant adjusts them so that the fins are opposite the faces of the dies $d^a$ $d^b$ when the second pressure occurs.

The combination of the heads D D', dies $d'$ $d^2$, and loose jaws $d^a$ $d^b$ is another feature of my invention.

For some classes of work it is desirable that the bed of the machine should be provided with an opening through which a part of the work may pass when the dies operate. In other classes of work it is necessary that the work should be supported above the opening when the dies operate. Another feature of my invention, therefore, is the combination of the heads D D' and their carriers with a frame, (in this case the bed X of the machine,) which has an opening $x$ opposite the dies for the work to pass through; and another feature of my invention is the combination of the dies $d$ $d'$ and their carriers, and a frame having an opening opposite the dies with a table removably mounted in the opening. The table is marked $x'$ in the drawings, and when in use is mounted in the opening $x$. (See Fig. 12.)

For greater convenience in adjusting the heads D D' in proper relation to each other, and especially for inserting and removing the table $x$, the head D' is mounted in ways in the bed of the machine and backed up by blocks $d^4$ $d^5$. When the blocks are lifted, as in Fig. 4, the head D' is readily drawn back by means of a screw $d^6$.

While the toggle-connection above explained is for heavy work the best connection between the shaft B and head D, an eccentric and strap may be used, if desired, as in Fig. 16, or a cam and cam-rod employed, as in Fig. 17. In Fig. 16 eccentric 1 on shaft B is connected to head D by an eccentric-strap 2. In Fig. 17 a cam 3 and cam-rod 4 connect shaft B and head D. For reciprocating the head D in its ways $x^2$ in the frame or bed X, the toggle, cam and cam-rod, and eccentric-strap are equivalents, and each connection is a perfectly practical connection; but for heavy work the toggle is, as I have said, the preferred connection between the shaft B and head D.

The operation is as follows: Starting with the toggles C C' (in the preferred construction) at an angle and with the projection $n^3$ between the stops $n^4$ $n^5$, and supposing the driving-shaft A to be revolving, the work is adjusted between the dies $d'$ $d^2$, the head D being then retracted from the head D'. A pull upon the lever $n^2$ then moves member $a^3$ toward member $a^4$, thereby making gear $b^2$ fast to shaft B and also releasing projection $n^3$ from stops $n^4$ $n^5$, and the shaft B is caused to rotate by means of the gears $a^2$ $b^2$, thereby depressing the toggle C C' through the action of eccentric $b'$ and connecting-rod $b$ to the position shown in Fig. 1 and forcing head D with great force toward head D', and causing the dies $d'$ $d^2$ to shape the band $m$ and force it into close, firm contact with the shot or shell M, as shown in Fig. 8. As soon as head D has withdrawn from the head D' sufficiently, the shot M can be turned to receive the second pressure, the lever $n^2$ can be thrown forward, causing the stop $n^5$ to strike against the projection $n^3$, and bring the projection $n^4$ into such position that it will be struck by the projection $n^3$, this motion of lever $n^2$ unclutching the clutch $a^3$ $a^4$ and stopping the motion of shaft B and of toggle C C'.

I am aware of United States Letters Patent No. 314,253, granted to Loring and Morton, March 24, 1885, and No. 333,103, granted to Bradford, December 29, 1885, and disclaim all that is shown in them. My invention differs radically from what is shown in these patents, in that two rotary shafts, one of which is provided with one or more fly-wheels and drives the other shaft, are in the construction embodying my invention combined with the reciprocating head and its companion head, and this is an invention wholly new with me and not suggested in the patents referred to. By it I obtain the enormous pressure which is desirable in presses adapted for the uses for which my presses are mostly intended, and without which the chief result I contemplate and have accomplished, as explained above, could not be obtained.

What I claim is—

1. In combination, shaft A, fly-wheel $a$ thereon, shaft B, head D, and ways $x'$ therefor, with means, substantially such as described—for example, gears $a^2$ $b^2$—for connecting shafts A and B, and means, substantially such as de-described—for example, eccentric $b'$, rod $b$, and toggle C C'—for connecting shaft B and head D, all arranged and operating substantially as and for the purpose set forth.

2. In combination, shafts A and B, toggle C C', and head D, the shaft A having upon it the fly-wheel $a$, with mechanism, substantially such as that described—for example, gears $a^2$ $b^2$—for connecting the shafts A and B, and mechanism, substantially such as described—for example, eccentric $b'$ and rod $b$—for connecting shaft B with the toggle, all arranged and operating substantially as described.

3. In combination, shaft A, gear $a^2$, shaft B, gear $b^2$, clutch $a^3$ $a^4$, connecting-rod $b$, toggle C C', and head D, substantially as described.

4. In combination, the toggle-levers C C', cylinder $C^2$, its trunnions $C^3$, and cheek-pieces $C^4$, substantially as described.

5. In combination, toggle C C', intermediate connector $d$, and head D, with mechanism, substantially such as described—for example, wedge $d^3$ and cross-piece $s'$—for adjusting head D with relation to connector $d$, substantially as and for the purpose set forth.

6. In a press substantially such as described, heads D D', combined with removable reducers $d'$ $d^2$, substantially as and for the purpose set forth.

7. In combination, heads D D', reducers $d'$ $d^2$, and loose dies $d^a$ $d^b$, substantially as and for the purpose set forth.

8. In combination, heads D D', ways $x'$ therefor, and frame X, having an opening $x$ opposite the heads, substantially as and for the purpose set forth.

9. In combination, heads D D', ways $x'$ therefor, frame X, having an opening $x$, and table $x^2$, mounted in opening $x$, substantially as and for the purpose set forth.

ALANSON TOWNSON BREWER.

Witnesses:
EUGENE M. JOHNSON,
FRANK G. NEWHALL.